J. D. ALLEN & J. A. CONLY.
MOTOR VEHICLE.
APPLICATION FILED APR. 26, 1906.
901,055.
Patented Oct. 13, 1908.
3 SHEETS—SHEET 2.
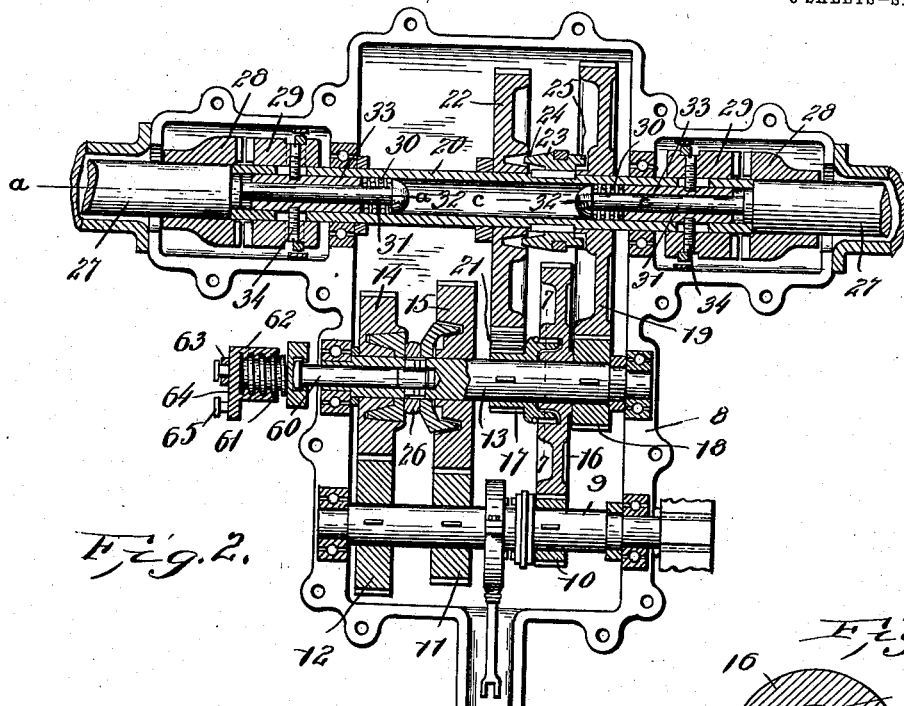
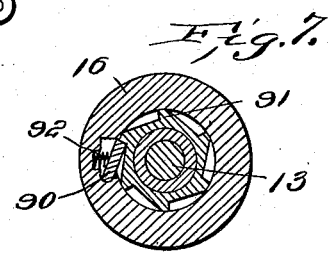
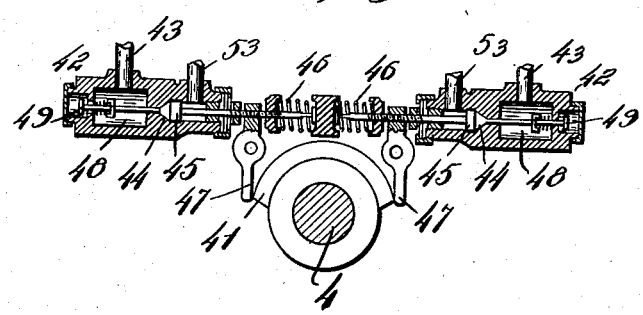
Witnesses
Inventors
J. D. Allen and
J. A. Conly.
By Howard A. Coombs
Their Attorney

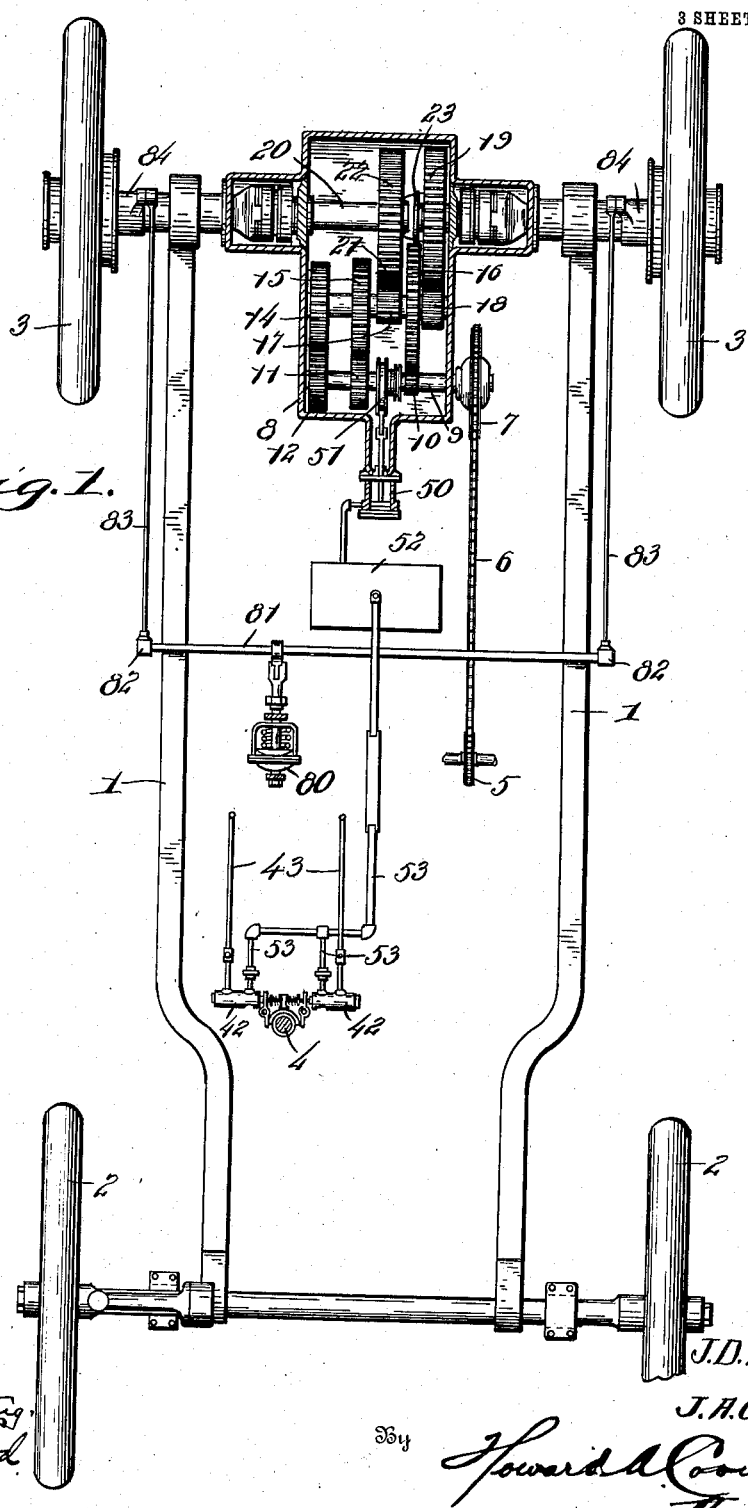

J. D. ALLEN & J. A. CONLY.
MOTOR VEHICLE.
APPLICATION FILED APR. 26, 1906.

901,055.

Patented Oct. 13, 1908.

3 SHEETS—SHEET 3.

Witnesses
L. Armstrong.
M. A. Wood.

Inventor
J. D. Allen and
J. A. Conly.

By Howard A. Coombs
Their Attorney

UNITED STATES PATENT OFFICE.

JOHN D. ALLEN AND JOHN A. CONLY, OF PHILADELPHIA, PENNSYLVANIA.

MOTOR-VEHICLE.

No. 901,055.  Specification of Letters Patent.  Patented Oct. 13, 1908.

Application filed April 26, 1906. Serial No. 313,776.

*To all whom it may concern:*

Be it known that we, JOHN D. ALLEN and JOHN A. CONLY, citizens of the United States, residing at Philadelphia, in the county of Philadelphia and State of Pennsylvania, have invented certain new and useful Improvements in Motor-Vehicles, of which the following is a specification.

Our invention relates to certain new and useful improvements in motor vehicles, the object being to produce a motor vehicle in which the transmission of power between the motor and the differential gear on the rear axle is accomplished in a more advantageous manner than heretofore; in which the differential gear is controlled from the steering-gear in an improved manner, and in which the means for changing from one speed to another and for reversing are simplified and improved.

In controlling the various clutches, as well as the brakes, we make use, in the preferred form of our invention, of a fluid under pressure, such as compressed air, whereby great facility and reliability in operation are obtained, and this form of motive power may be applied to the actuation of some or all of the power, speed and direction-controlling means, as desired.

Figure 4:
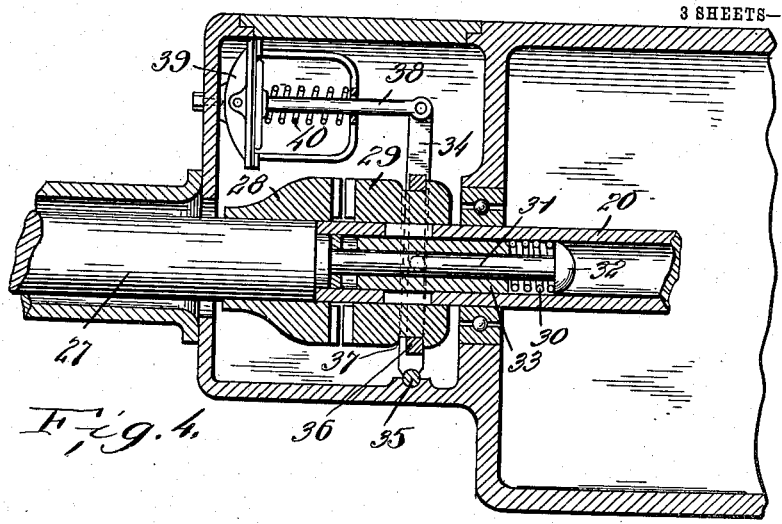
Figure 5:
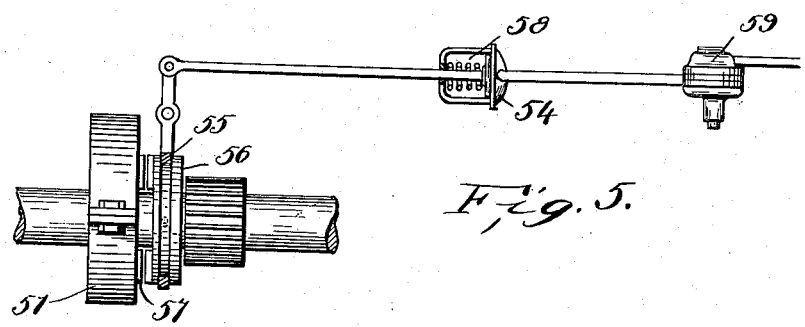
Figure 6:
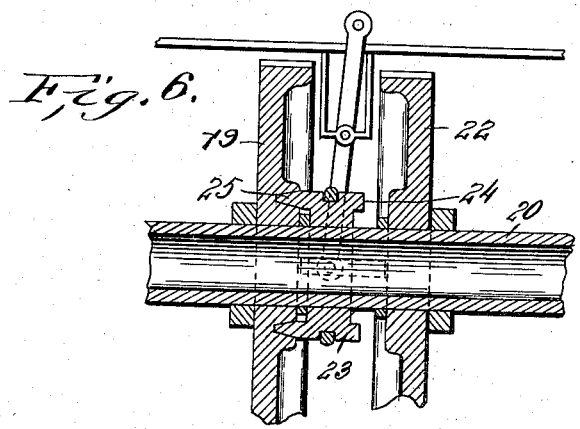

The constructions and arrangements comprising our invention, as well as the advantages gained thereby, will more fully appear from the accompanying drawings, in which, Figure 1 is a plan view of the running gear of an automobile equipped with our improvements; Fig. 2 is a horizontal section through the differential and transmission gearing; Fig. 3 is a cross-section through the steering-post, showing, also in section, the air-valves for the differential clutches; Fig. 4 is a vertical section through one of the differential clutches and its operating means taken on the line $a$—$a$ of Fig. 2; Fig. 5 is a detailed view of the clutch for the eccentric which drives the air-compressor. Fig. 6 is a vertical section through the driving gears for the differential taken on the line $c$—$c$ of Fig. 2; and Fig. 7 is a cross-section on line 7—7 of Fig. 2, showing the pawl-and-ratchet connection between the gear 16 and the shaft 13.

Referring now to Fig. 1, 1 represents the frame of the running-gear, 2 the front wheels and 3 the rear wheels of a motor-vehicle.

4 represents the steering-post but the mechanism connecting the same with the front wheels is not shown as it may be of any of the usual constructions.

5 represents the driving sprocket of the motor, which may be actuated by any motive-power, and 6 the sprocket-chain which communicates the power to the transmission gearing by the sprocket-wheel 7. The motor may, of course, be directly connected.

The transmission-gearing, as also the differential-gear, is inclosed in a casing 8, which is swung upon the rear axle, or rather upon the differential sleeve 20, which surrounds the inner ends of the rear axles, and consists of the primary shaft 9, carrying keyed thereto the driving pinions 10, 11 and 12, the intermediate shaft 13, carrying loose thereon the gears 14 and 15, and the over-running gear 16, and having secured thereto the pinions 17 and 18, the said pinions 10, 11 and 12 meshing respectively with said gears 16, 15 and 14. The pinion 18 meshes with the gear 19 loosely mounted on the differential sleeve 20, while the pinion 17 meshes, through an intermediate gear 21, with the gear 22, also loose on the sleeve 20.

The gears 19 and 22 are adapted to be alternately clutched to the sleeve 20 by a sliding clutch sleeve 23, keyed to the sleeve 20, and having friction-surfaces 24, co-acting with like surfaces on gear 22, which is the reversing-gear, and teeth 25, coacting with like teeth on gear 19, which is the gear used in the forward drive.

Gears 14 and 15 are adapted to be alternately clutched to intermediate shaft 13 by the sliding friction-clutch sleeve 26, while gear 16 has a pawl-and-ratchet connection with said shaft, the same comprising a pawl 90 seated in a recess in the hub of said gear and pressed towards the ratchet 91, fast on said shaft, by a spring 92, as shown in Fig. 7, whereby said gear runs idly when shaft 13 is driven by either pinion 11 or 12, but is driven by pinion 10 when both gears 14 and 15 are unclutched. This pawl-and-ratchet, or "over-running" connection is of ordinary and well-known construction. It will now be evident that the shaft 13 may be driven from shaft 9, either through pinion 10 and gear 16, or pinion 11 and gear 15 or pinion 12 and gear 14, and that sleeve 20 may be driven from shaft 13, either by pinion 18 and gear 19 or pinion 17, intermediate gear 21 and gear 22. Each section 27 of the divided rear axle carries a fixed clutch member 28, adapted to engage with a sliding clutch member 29 mounted on sleeve 20. These clutches are kept normally in engagement by springs 30, surrounding the reduced ends 31 of the axle sections, which carry nuts 32 on their ends, and bearing against slidable bushings 33, to which are secured, by means of set screws 34, passed through slots in sleeve 20, the clutch-members 29.

When the vehicle is traveling in a straight line, both clutches are, of course, in engagement, but when the steering wheel is turned to take the vehicle around a curve for instance, the clutch on the inner side is automatically disengaged, the clutch-member 29 being slid on the sleeve 20 by the following mechanism, see Fig. 4.

A lever 34, pivoted at 35 in the casing 8, and carrying a yoke 36, engaging the groove 37 in the clutch-member 29, is articulated at its other end to the piston rod 38 of an air-cylinder 39, preferably of the diaphragm type. A spring 40, surrounding the rod 38, assists the spring 30 in normally keeping the clutch-members in engagement, but when compressed air is admitted to the other side of the diaphragm the spring 40 is compressed and the rod 38 moved outwardly to disengage the clutch. The control of the air to these air-cylinders is, as before stated, by the steering gear, and the means illustrated for accomplishing this comprises a cam 41 on the steering-post and the air-valves 42, see Fig. 3. It should first be stated, however, that the supply of air under pressure is maintained by a pump 50, driven by an eccentric 51 on shaft 9, and connected to a tank or reservoir 52, from which pipes 53 lead to said valves 42. The eccentric 51 is automatically unclutched from shaft 9 when the pressure in the tank reaches a certain amount, by means of a diaphragm chamber 54, see Fig. 5, the diaphragm of which is connected to a yoke 55, engaging the sliding clutch member 56, which is normally held in engagement with the clutch member 57, on the eccentric 51, by a spring 58. Air is admitted to the chamber 54 from the tank through a reducing valve 59. The air-valves 42 being alike a description of one of them will be sufficient.

The air from the tank 52 is supplied to the valve by a pipe 53, as above stated, and a pipe 43 leads from the valve to the diaphragm air-cylinder 39. The casing of the valve, between the said two pipes, carries a conical valve-seat 44, against which the conical valve 45 normally bears, being pressed thereagainst by a spring 46, surrounding its stem outside of the casing. The valve 45 is raised from its seat, when the steering wheel is turned, by means of the cam 41 acting on the lever 47, which adjustably engages the valve-stem. The air then flows past said valve into the enlarged chamber 48, of the valve casing and thence through the pipe 43 to the diaphragm cylinder. The end of said chamber has an exhaust opening which is closed by the valve 49 carried by the stem of valve 45, when the latter is raised from its seat. A spring may be used, as shown, to assist in seating said valve 49.

The means for actuating the clutch 26 on the intermediate shaft 13, may be fluid-operated by pneumatic motors similar to those for actuating the clutch-members 29, but, as here shown, is mechanically operated, the construction comprising a rod 60, mounted to slide within the bore of the said shaft and connected, as by pins, to the clutch 26. Said rod is headed at its outer end, and engages an annular recess in the head of a worm or screw 61, with which meshes a nut 62 maintained from longitudinal movement by engagement with a bracket or projection 63 carried by the vehicle frame. Said nut carries an arm 64 provided with a crank pin 65, connected with a hand-lever (not shown), whereby said nut can be rotated and, consequently, said rod 60 be moved longitudinally to shift the clutch 26 into engagement with either gear 14 or 15, or into an intermediate position.

In addition to actuating the differential clutches by compressed air, the brakes may be also so actuated, as shown diagrammatically in Fig. 1. A diaphragm chamber 80 is connected by its piston-rod to a rock-shaft 81, which carries at its ends arms 82, connected by links 83 to the brake-sleeves 84. The control of the air to the diaphragm chamber 80 is, of course, by a manually-operated valve arranged in convenient relation to the steering wheel.

What we claim is—

1. In a motor vehicle, the combination with the frame thereof and the rear wheels journaled on said frame, of a divided driving shaft for said wheels, comprising a hollow central section having two gears loose thereon, a clutch movable to connect either gear thereto, and clutch members slidably mounted at either end thereof; and two end sections, the reduced inner ends of which are journaled in the ends of said hollow central section, each end section carrying a fixed clutch member coöperating with the corresponding slidable clutch member on the adjacent end of said central section, and means to actuate said slidable clutch members.

2. In a motor vehicle, the combination with the frame thereof and the rear wheels journaled on said frame, of a divided driving shaft for said wheels, comprising a hollow-central section having two gears loose thereon, a clutch movable to connect either gear thereto, and clutch-members slidably mounted at either end thereof, and two end sections, each having its inner end reduced in diameter, journaled in the adjacent end of said hollow central section and held therein by spring pressure, and each having a fixed clutch-member secured thereto in position to coöperate with the adjacent slidable clutch-member on the said hollow central section, and means controlled by the steering-post to actuate said clutches.

3. In a motor vehicle, the combination with the frame thereof and the rear wheels journaled on said frame, of a divided driving-shaft for said wheels, comprising a hollow-central section having two gears loose thereon, a clutch movable to connect either gear thereto, and clutch members slidably mounted at either end thereof, and two end sections each journaled in the end of said hollow, central section and carrying a fixed clutch member coöperating with the adjacent one of said slidable clutch-members, a pneumatic motor operatively connected to each of said slidable clutch-members, a source of air-pressure and connections therefrom to each of said motors including a valve, and means controlled by the movements of the steering-post to actuate said valves.

4. In a motor vehicle, the combination with the rear wheels, of a driving-shaft for said wheels comprising two end sections and a central section, clutches to connect said central section to said end-sections, means to drive said central section in either direction, a source of air supply, pneumatic-motors operatively connected to each of said first-mentioned clutches, connections between said source of air-supply and each of said motors, including a valve and means carried by the steering-post to admit air to one or the other of said motors according to the direction in which the steering-post is turned.

5. In a motor vehicle, the combination with the rear wheels thereof, of a driving-shaft for the same, comprising a central section and two end-sections, two gears loosely mounted on said central-section and a clutch to connect either of them thereto, fixed clutch-members on the inner ends of said end-sections and coöperating slidable clutch-members on the outer ends of said central-section, a pneumatic motor operatively connected to each of said slidable clutch-members, means to drive said gears, comprising a primary shaft running at a uniform speed and an intermediate shaft driven therefrom through change gearing and carrying pinions in mesh with said gears, an air-compressor and means on said primary shaft to drive the same, an air-reservoir connected to said compressor and to each of said motors, a valve for each of said motors and means carried by the steering-post to actuate one of said valves when the steering post is turned in one direction and the other when it is turned in the other direction.

In testimony whereof we have affixed our signatures in presence of two witnesses.

JOHN D. ALLEN.
JOHN A. CONLY.

Witnesses:
JOSEPH M. SMITH,
ARTHUR C. BONNELL.